United States Patent [19]

Lips et al.

[11] 4,326,965

[45] Apr. 27, 1982

[54] LIQUID FABRIC-SOFTENING COMPOSITION

[75] Inventors: Alexander Lips, Birkenhead; Stuart K. Pratley, Wirral, both of England

[73] Assignee: Levers Brothers Company, New York, N.Y.

[21] Appl. No.: 150,828

[22] Filed: May 19, 1980

[30] Foreign Application Priority Data

May 21, 1979 [GB] United Kingdom ............... 17532/79

[51] Int. Cl.³ .................... D06M 13/46; D06M 15/16; C08K 5/17; C08L 5/02

[52] U.S. Cl. ........................................ 252/8.8; 252/8.6

[58] Field of Search .......................................... 252/8.8

[56] References Cited

U.S. PATENT DOCUMENTS

| | | | |
|---|---|---|---|
| 3,537,993 | 11/1970 | Coward et al. | 252/8.8 |
| 3,676,341 | 7/1972 | Gerecht et al. | 252/8.8 |
| 3,703,480 | 11/1972 | Grand et al. | 252/8.8 |
| 4,038,196 | 7/1977 | Minegishi | 252/8.8 |
| 4,140,641 | 2/1979 | Kamachandran | 252/8.75 |
| 4,154,711 | 5/1979 | Gandurin et al. | 252/8.8 |

FOREIGN PATENT DOCUMENTS

| | | | |
|---|---|---|---|
| 779319 | 2/1968 | Canada | 252/8.8 |
| 2459354 | 6/1976 | Fed. Rep. of Germany . | |
| 2724816 | 12/1977 | Fed. Rep. of Germany | 252/8.8 |
| 45-451679 | 1/1970 | Japan | 252/8.8 |
| 1404494 | 8/1975 | United Kingdom . | |
| 1407013 | 9/1975 | United Kingdom . | |
| 1459935 | 12/1976 | United Kingdom . | |
| 1482514 | 8/1977 | United Kingdom . | |
| 1484526 | 9/1977 | United Kingdom . | |
| 1486619 | 9/1977 | United Kingdom . | |
| 1538866 | 1/1979 | United Kingdom . | |
| 1576325 | 10/1980 | United Kingdom . | |

*Primary Examiner*—Maria Parrish Tungol

*Attorney, Agent, or Firm*—James J. Farrell; Melvin H. Kurtz

[57] ABSTRACT

Concentrated, liquid fabric-softening compositions containing 15–60% of a cationic fabric-softening agent, and an aqueous medium, are prepared by inclusion therein of an effective amount of polymer, such as polyethyleneglycol with a molecular weight of 6,000. These compositions are water-dispersible and pourable, and can be easily dosed into the rinse cycle of a washing process, e.g. by means of automatic dosing devices in the washing machine.

22 Claims, No Drawings

LIQUID FABRIC-SOFTENING COMPOSITION

The present invention relates to a liquid fabric-softening composition. More particularly, it relates to an aqueous concentrated liquid fabric-softening composition.

Aqueous liquid fabric-softening compositions are well-known in the art and are being used nowadays quite commonly in domestic laundering. Most of the present day domestic fabric-softening compositions are aqueous dispersions containing from about 3 to 7% of an active cationic softening agent, as well as a number of additives such as rewetting agents, viscosity modifiers, fluorescers, perfumes, colorants and so on. These products are normally used in the last rinse of a washing process, whereby the fabric fibres take up a certain amount of the active cationic softening agent, resulting in a soft, fluffy feel of the fabric.

These products however often show, in a freeze/-thaw cycle, disadvantages in that they tend to be unstable, resulting in gels or in inhomogeneous products. Furthermore, in view of their low content of active cationic softening agent, and their high water content, substantial amounts have to be dosed in the rinse, which, expecially when the washing machine is equipped with a semi-automatic or fully automatic dosing device, requires substantial provisions to cope with these relatively large volumes of products. The high water content makes the packaging costs of these products, in relation to their level of active ingredients, unsatisfactorily high.

As a solution to some of the above problems it has been proposed to prepare more concentrated liquid fabric-softening compositions. In view however of the fact that the more active cationic softening agents have a relatively limited solubility in water, and/or tend to gel at higher concentrations in water, special measures have to be taken such as the use of more-soluble, but less effective cationic softening agents or the use of appreciable amounts of solvents, sometimes even up to 40%.

The use of such appreciable amounts of solvents however presents problems in that they must not affect the human skin, and that their handling requires special measures, as they are often inflammable materials, yielding products with unacceptably low flash points. Furthermore, on dilution of these solvent-containing products with water, e.g. in the rinse cycle, gelatinous precipitates on the fabric may occur, which may lead to stains.

Hence, it is an object of the present invention to provide an aqueous concentrated liquid fabric-softening composition which is, under user's conditions, water-dispersible and preferably stable, pourable and easily dosable, and which requires a significantly reduced amount of a solvent or not solvent at all (the term solvent in this specification is understood to exclude water).

It has now quite unexpectedly been found that the above object can be achieved to a significant degree by including in an aqueous medium, which contains an active cationic softening agent, an amount of a polymer fulfilling certain requirements which will be defined and discussed in more detail. By inclusion of the polymer it has been found possible to obtain water-dispersible, pourable, stable, concentrated, aqueous compositions with a level of active cationic softening agent far exceeding 15%, even more than 40% by weight. The addition of solvents to these compositions is not necessary, but up to 15% of a solvent may be suitably incorporated, and up to 20% may be tolerated.

In its broadest aspects, therefore, the present invention relates to an aqueous, liquid concentrated fabric-softening composition comprising from 25–75% by weight of an aqueous medium, from 15–60% by weight of a cationic softening agent, and from 0.5–40% by weight of a polymer, to be defined hereafter.

It is to be understood that the terminology "aqueous medium" is inclusive of aqueous, solvent-containing media.

The compositions can be a solution or an emulsion or a dispersion, depending on the nature and concentration of the ingredients in the composition, and is stable, pourable, dosable and water-soluble or -dispersible to a satisfactory degree for most practical purposes.

The invention will now be described in more detail. Unless otherwise indicated, the percentages are by weight.

THE ACTIVE CATIONIC FABRIC-SOFTENING AGENT

As stated above, the composition contains from 15 to 60% by weight of a cationic fabric-softening agent. Preferably this amount ranges from 20 to 50% and particularly preferably 20 to 45% by weight. Any well-known cationic fabric-softening agent can be used in the present invention, as well as mixtures of two or more of such agents.

Suitable examples of cationic fabric-softening agents are quaternary ammonium compounds containing two long alkyl or alkenyl chains with 12–22 carbon atoms such as di(hardened or unhardened tallow) dimethyl ammoniumchloride, 2-heptadecyl-2-methylstearoyl amido ethyl imidazoline methosulphate, di-(coco)-dimethyl ammoniumchloride, etc. These cationic fabric-softening agents are well-known in the art and further suitable examples can be found in Schwartz-Perry: "Surface-active agents and Detergents" Vol. II, 1958.

Relatively water-soluble cationic softening agents, such as the monoalkyl quaternary ammonium compounds such as stearyltrimethylammoniumchloride, may also be used, but, as they are often less effective softeners, they are preferably used in conjunction with other, noncationic softening agents such as fatty acid esters of polyols like sorbitantristearate, glycerolmonostearate, and so on, or with anionic detergents with which they are capable of forming softening complexes, such as fatty acid soaps. They may also be made more hydrophobic by treatment with suitable hydrophobizing agents such as long chain alcohols and fatty acids. The present invention is however of particular benefit if the more effective, less watersoluble cationic softening agents having two long alkyl chains are used.

THE POLYMER

The polymer which is included in the composition of the invention is present therein in an amount of from 0.5 to 40%, preferably from 1 to 30%, and particularly preferably 4–25%. The polymer, suitable for inclusion, is defined in the following way:

The polymer should be water-soluble under user's conditions, and a 20% aqueous solution of the polymer should have a viscosity ($\eta$) of $\leqq 50$, preferably $\leqq 30$ and especially preferably $\leqq 15$ cP, as measured at 25° C. and 110 $sec.^{-1}$ in a Haake Viscometer. Said 20% aqueous solution should also show a vapour pressure equal to or lower than the vapour pressure of a 2% aqueous solution of polyethyleneglycol with a molecular weight of 6,000, preferably equal to or lower than that of a 10% aqueous solution of said polyethyleneglycol, and particularly preferably equal to or lower than that of an 18% aqueous solution of said polyethyleneglycol. The said aqueous polymer solution can be of water and polymer only, or can include solvent-containing media normally derived from the raw materials or additives, or include additives specifically designed to improve the vapour pressure lowering capacity of the polymer, or, in the case of ionic polymers, include adjustments to pH in order to optimise ionisation. Such vapour pressure measurements can be obtained using an Hewlett Packard vapour pressure osmometer, using an operating temperature of 34.5° C. or using any other suitable vapour measuring device.

The polymer should furthermore have a molecular weight of at least 400, preferably at least 4,000 and particularly preferably at least 6,000.

It is desirable, furthermore, that the polymer does not negatively interact with any of the other ingredients of the composition.

Suitable examples of the polymer can be thus obtained from the polyalkyleneglycols, the polyalkylene imines, dextran and other natural or synthetic (co)-polymers, as long as they meet the above criteria.

Mixtures of two or more polymers of the same type or of different type may also be used.

A preferred class of polymers comprises polyethyleneglycols with an average molecular weight of abt. 1.000 to abt. 6000. These polymers, and especially those with an average molecular weight of 4.000 or 6.000, are particularly suitable for compositions of the invention with a high level of relatively water-insoluble cationic fabricsoftening agent.

Other typical examples of suitable polymers are dextran with a molecular weight of 10,000 and polyethylene imine with a molecular weight of 45-750. The balance of the composition comprises the aqueous medium, as the case may be with the other ingredients as set out below. The aqueous medium comprises 25-75%, preferably 30-70%, and especially preferably 40-70% of the composition.

OTHER INGREDIENTS

The compositions of the invention may further comprise additional beneficial ingredients, commonly used or proposed for inclusion in liquid fabric-softening compositions. Such ingredients, either alone or incorporated in suitable carriers, are viscosity modifiers, germicides, fluorescers, perfumes including deodorizing perfumes, organic or inorganic acids, antistats, soil-release agents, colorants, antioxidants, bleaches, bleach precursors, anti-yellowing agents, ironing aids etc., all in the conventional minor amounts. Enzymes such as cellulases may also be included.

The compositions may also contain, in addition to the cationic fabric-softening agents, other non-cationic fabric-softening agents such as nonionic fabric-softening agents (e.g. sorbitanmonostearate, glycerolmonostearate), $C_{12}$–$C_{40}$ paraffins, silicons, etc.

The compositions may contain, as said before, up to 20% of a solvent, such as a lower alkanol, a glycol, a glycolether and the like, but preferably contain 15% or less of a solvent. They may even be made without a solvent at all. When the cationic fabric-softening agent is supplied in the form of an aqueousalcoholic solution, that alcohol content is included in the above amounts, and if necessary only a small amount of extra alcohol is to be added. A suitable solvent is isopropanol.

The compositions of the invention may be prepared in any suitable way. Thus, the cationic fabric-softening agent, the polymer, water and, as the case may be, a solvent can be admixed under agitation in any desired sequence. The cationic fabric-softening agent may also be melted first, after which the other ingredients are added to the melt. The polymer and/or water may also be added incrementally.

The invention will now be further illustrated by way of Examples, in which the percentages are by weight.

The viscosity data of the polymers used in the Examples, are as follows for 20% aqueous solutions (at 25° C., 110 $sec.^{-1}$ in a Haake Viscometer):

| | |
|---|---|
| polyethyleneglycol 6,000 | 12.3 cP |
| polyethyleneglycol 4,000 | 8.6 cP |
| polyethyleneglycol 1,000 | 3.4 cP |
| polyethyleneimine (M.W. 450-750) | 13.0 cP |
| dextran 10,000 | 6.0 cP. |

EXAMPLE 1

513 g of a 75% dispersion of nominally di(unhardened tallow)-imidazoline methosulphate in aqueous isopropyl alcohol, 163 g of a 50% aqueous solution of polyethyleneglycol with a molecular weight of 6000, and 250 g of deionised water were mixed sequentially with gentle stirring. A low-viscosity, white emulsion was obtained. The product had the following composition:

| | |
|---|---|
| Cationic fabric-softening agent | 41.6% |
| polymer | 8.8% |
| isopropyl alcohol | 11% |
| water | 38.6%. |

This product had a flash point (determined according to ASTM E 134-58 T, using a Pensky-Martens closed cup apparatus) of below 35° C. and above 30° C.

EXAMPLE 2

213 g of a 94% dispersion of nominally di(unhardened tallow)-imidazoline methosulphate in aqueous isopropanol was carefully heated to 70° C., resulting in a clear, low-viscosity liquid. To this liquid a solution of 42.5 g of polyethyleneglycol with a molecular weight of 6000 in 171 g of deionised water at 70° C. was added with vigorous stirring. A creamy white paste of a temperature of 60° C. was obtained. A further 9 g of the polyethylenglycol, dissolved in 65 g of deionised water, were added under agitation, and a low-viscosity white emulsion was obtained. The product had the following composition:

| | |
|---|---|
| cationic fabric-softening agent | 40.0% |
| polymer | 10.3% |
| isopropyl alcohol | 1.3% |
| water | 48.4% |

This product had a flash point of above 98° C.

EXAMPLE 3

140 g of a 75% dispersion of nominally di(hardened tallow) dimethyl ammoniumchloride in aqueous isopropyl alcohol and 100 g of a 75% dispersion of nominally di(coco)dimethyl ammonium-chloride in aqueous isopropanol, and 20 g of isopropyl alcohol were gently heated to give a clear, low-viscosity liquid. To this mixture, 40 g of a warm 50% aqueous solution of polyethyeleneglycol (M.W. 6000), and 100 g of warm deionised water were added with stirring. After cooling, a further 30 g of the polyethyeleneglycol, dissolved in 90 g of deionised water and 2 g of isopropyl alcohol were mixed in. A low-viscosity, off-white emulsion was obtained. This product had the following composition:

| | |
|---|---|
| cationic fabric-softening agents | 34.4% |
| polymer | 9.7% |
| isopropyl alcohol | 13.4% |
| water | 42.5% |

EXAMPLE 4

10 g of an 80% dispersion of nominally di(unhardened tallow)-imidazoline methosulphate in aqueous isopropyl alcohol, and 4 g of a 65% aqueous solution of polyethylene glycol with a molecular weight of 4,000, and 6 g of deionised water were mixed. A low-viscosity, off-white emulsion was obtained. This product had the following composition:

| | |
|---|---|
| cationic fabric-softening agent | 40.0% |
| polymer | 13.0% |
| isopropyl alcohol | 7.5% |
| water | 39.5% |

EXAMPLE 5

59 g of a 75% dispersion of nominally di(hardened tallow)dimethyl ammoniumchloride in aqueous isopropyl alcohol were gently heated to 45° C., and then 11 g of polyethyleneglycol, molecular weight 6,000, dissolved in 30 g of deionised water, also at 45° C., were mixed in. The mixture was stirred continuously until it had cooled to less than 30° C., to give a low-viscosity white emulsion. A further 12 g of polyethyleneglycol, molecular weight 6000, dissolved in 24 g $H_2O$ were mixed in at 30° C. to form a stable low-viscosity white emulsion. This product had the following composition:

| | |
|---|---|
| cationic fabric-softening agent | 32.5% |
| polymer | 17.0% |
| isopropyl alcohol | 8.7% |
| water | 41.8% |

EXAMPLE 6

40 g of a 75% dispersion of nominally di(hardened tallow)dimethyl ammoniumchloride in aqueous isopropyl alcohol and 40 g of a 75% dispersion of nominally di(tallow)imidazoline methosulphate in aqueous isopropyl alcohol were mixed together and heated to 40° C. 30 g of polyethyleneglycol, molecular weight 6,000, in 90 g of deionised water were added under agitation and a stable low-viscosity white emulsion was obtained. This product had the following composition:

| | |
|---|---|
| cationic fabric-softening agent | 30% |
| polymer | 15% |

-continued

| | |
|---|---|
| isopropyl alcohol | 8% |
| water | 47% |

EXAMPLE 7

50 g of a 75% dispersion of nominally di(tallow)imidazoline methosulphate in aqueous alcohol were mixed with 5 g of polyethyleneimine with a molecular weight of 450–750 dissolved in 45 g of deionised water to give an off-white pourable emulsion. The product had the following composition:

| | |
|---|---|
| cationic fabric-softening agent | 37.5% |
| polymer | 5% |
| isopropyl acohol | 10.0% |
| water | 47.5% |

EXAMPLE 8

50 g of a 75% dispersion of nominally di(tallow)imidazoline methosulphate in aqueous alcohol were mixed with 5 g Dextran (molecular weight 10,000 ), dissolved in 45 g deionised water to give a pourable white emulsion. The product had the following composition:

| | |
|---|---|
| cationic fabric-softening agent | 37.5% |
| polymer | 5.0% |
| isopropyl alcohol | 10.0% |
| water | 47.5% |

EXAMPLE 9

500 g of a 90% dispersion of nominally di(tallow)dimethyl ammoniumchloride in aqueous alcohol were gently heated until it cleared. 100 g of polyethyleneglycol (molecular weight 6,000), in 400 g of deionised water were added at the same temperature. The mixture was stirred and allowed to cool.

Three products were made with different perfumes by mixing 6 g of a perfume and 60 g of deionised water with 300 g of the unperfumed cooled mix. The three perfumes were:

| | | |
|---|---|---|
| (a) | Lilas HW 3142 | ex I.F.F. |
| (b) | LP274 | ex P.P.L. |
| (c) | HY4261 | ex I.F.F. |

Each of these products was a stable, perfumed, low-viscosity, white emulsion with the following composition:

| | |
|---|---|
| cationic fabric-softening agent | 36.9% |
| polymer | 8.2% |
| perfume | 1.64% |
| isopropyl alcohol | 2.1% |
| water | 51.16% |

EXAMPLE 10

Five products were prepared. Each contained 6 g of a 75% dispersion of nominally di(tallow)imidazoline methosulphate in aqueous isopropanol. Apart from a water control (a), they contained 1 g of a nonionic ethylene oxide condensate as described below. This was added as a solution in 5 g of deionised water. All the products contained 37.5% of the cationic fabric softener.

(a) 62.5% water
(b) 8% polyethyleneglycol (molecular weight 6,000); 54.5% water
(c) 8% linear $C_{12}$–$C_{14}$ primary alcohol, condensed with 3 moles of ethylene oxide;
54.5% water
(d) 8% sec. $C_{11}$–$C_{15}$ linear alcohol, condensed with 7 moles of ethylene oxide;
54.5% water
(e) 8% sec. $C_{11}$–$C_{15}$ linear alcohol, condensed with 15 moles of ethylene oxide;
54.5% water Products (a) and (c) were non-pourable and viscous, and not water-dispersible, (d) and (e) were pourable, but viscous, and not water-dispersible, (b) however, was a stable, pourable, water-dispersible, low-viscosity white emulsion.

EXAMPLE 11

67 g of a 75% dispersion of nominally di(tallow-)imidazoline methosulphate in aqueous isopropyl alcohol, was mixed with 4.5 g of polyethylene glycol, molecular weight 1,000, dissolved in 28.5 g of deionised water, to give a low-viscosity white emulsion having the following composition:

| | |
|---|---|
| Cationic fabric-softening agent | 50% |
| polymer | 4.5% |
| isopropyl alcohol | 14% |
| water | 31.5%. |

EXAMPLE 12

50 g of a 75% dispersion of nominally di(tallow-)imidazoline methosulphate in aqueous isopropyl alcohol was mixed with 5 g of polyethylene glycol, molecular weight 6,000, dissolved in 30 g of deionised water, to give a viscous white emulsion. To this an additional 4 g of poly(ethylene glycol), molecular weight 4,000, dissolved in 11 g of deionised water, were added, to give a low-viscosity white emulsion with the following composition:

| | |
|---|---|
| cationic fabric-softener | 37% |
| polymer | 9% |
| isopropyl alcohol | 10% |
| water | 44% |

EXAMPLE 13

28 g of a 75% dispersion of nominally di(hardened tallow)dimethyl ammonium chloride in aqueous isopropyl alcohol, plus 19 g of a 75% dispersion of di-alkyl dimethyl ammonium chloride in aqueous isopropyl alcohol, wherein the alkyl chain had a chain distribution of nominally 12% C12, 34% C14, 37% C16 and 15% C18, plus 12.5 g of polyethylene-glycol 6,000 dissolved in 40.5 g of deionised water, were heated together to 50° C. and mixed thoroughly. When the mix had cooled, a low-viscosity emulsion was obtained which had the following composition:

| | |
|---|---|
| cationic fabric-softening agents | 35% |
| polymer | 12.5% |
| isopropyl alcohol | 11% |
| water | 41.5% |

EXAMPLE 14

176.9 g of a 50% solution of stearyl trimethyl ammonium chloride in aqueous isopropyl alcohol was mixed with 44.7 g of sodium laurate at 70° C. Aqueous isopropyl alcohol (1:2) was added until the mixture cleared. This was then dispersed in deionised water, also at 70° C. Sufficient ethyl acetate was mixed in at this temperature so that, when it formed a separate layer, the aqueous layer was clear. The ethyl acetate layer was separated off, cooled and filtered. The filtered solid was washed with acetone and repeatedly dissolved in hot ethyl acetate, cooled and filtered. 13 g of the stearyl trimethyl ammonium laurate thus obtained were melted with 3 g of isopropyl alcohol and 1 g of water. 4 g of polyethylene glycol, molecular weight 6,000 dissolved in 29 g of deionised water, was added at room temperature and the resulting mixture was cooled to give a stable white emulsion with the following composition:

| | |
|---|---|
| fabric-softening agent | 26% |
| polymer | 8% |
| isopropyl alcohol | 6% |
| water | 60%. |

EXAMPLE 15

11 g of stearyl trimethyl ammonium chloride, 6.5 g coconut fatty acid, 5 g isopropyl alcohol and 1 g deionised water were mixed together and heated to 70° C. To this 5 g of polyethylene oxide, molecular weight 1,000, dissolved in 21.5 g of deionised water, were mixed and allowed to cool, giving a white emulsion having the following composition:

| | |
|---|---|
| fabric-softening agent | 35% |
| polymer | 10% |
| isopropyl alcohol | 10% |
| water | 45% |

EXAMPLE 16

To 5 g of each of the cationics listed below, heated to give clear liquids, 2 g of a 50% aqueous solution of polyethylene glycol (m.w. 6,000) and 3 g of deionised water were added and mixed together at the same temperature. These gave low-viscosity white emulsions on cooling. They had the following general composition:

| | |
|---|---|
| cationic fabric-softening agent | 37.5% |
| polymer | 10.0% |
| isopropyl alcohol | 10.0% |
| water | 42.5%. |

The cationics used were 75% dispersions, in aqueous isopropyl alcohol, of nominally
di (soft tallow) dimethyl ammonium chloride
di (oleyl) imidazoline methosulphate
di (oleyl) dimethyl ammonium chloride.

EXAMPLE 17

To 4.2 g of each of the cationics listed below, heated to give clear liquids, 3 g of a 50% aqueous solution of polyethylene glycol (m.w. 6,000) and 2.8 g of deionised water were added and mixed together at the same temperature. These gave low-viscosity white emulsions on cooling. Thye had the following general composition:

| | |
|---|---|
| cationic fabric-softening agent | 37.8% |
| polymer | 15.0% |
| isopropyl alcohol | 4.2% |
| water | 43.0% |

The cationics used were 90% dispersions, in aqueous isopropyl alcohol, of nominally:

di (soft tallow) 2-hydroxy ethyl diamidoamine methosulphate di (soft tallow) 2-hydroxy propyldiamidoamine methosulphate di (soft tallow) diamido methosulphate.

We claim:

1. An aqueous, liquid concentrated fabric-softening composition comprising from 25–75% by weight of an aqueous medium, from 15–60% by weight of a cationic softening agent which is a quaternary ammonium compound containing at least one $C_{12}$–$C_{22}$ alkyl- or alkenyl group, said alkyl- or alkenyl group not being linked through an ester linkage, and from 4 to 25 by weight of a polymer, said polymer being water-soluble, having a viscosity (20% aqueous solution at 25° C. and 110 $sec.^{-1}$ in a Haake Viscometer) of 50 or less cP, having a vapor pressure (20% aqueous solution ) equal to or lower than the vapor pressure of a 2% aqueous solution of polyethyleneglycol with a molecular weight of 6,000, said polymer having a molecular weight of at least 400.

2. A composition according to claim 1, comprising 20–50% by weight of the cationic softening agent.

3. A composition according to claim 2, comprising 20–45% by weight of the cationic softening agent.

4. A composition according to claim 1, wherein the cationic softening agent is a dialkyl quaternary ammonium compound having two long alkyl or alkenyl chains with 12–22 carbon atoms.

5. A composition according to claim 4, wherein the cationic softening agent is di(hardened or unhardened tallow) dimethyl ammoniumchloride, 2-heptadecyl-1-methylstearoyl amido ethyl imidazoline methosulphate, or di(coco)dimethylammonium chloride.

6. A composition according to claim 1, comprising 1–30% by weight of the polymer.

7. A composition according to claim 1, comprising a polymer having a viscosity of equal to or less than 30 cP.

8. A composition according to claim 7, comprising a polymer having a viscosity of equal to or less than 15 cP.

9. A composition according to claim 1, comprising a polymer, a 20% aqueous solution of which shows a vapour pressure equal to or lower than that of a 10% aqueous solution of polyethyleneglycol with a molecular weight of 6,000.

10. A composition according to claim 9, comprising a polymer, a 20% aqueous solution of which shows a vapour pressure equal to or lower than that of an 18% aqueous solution of polyethyleneglycol with a molecular weight of 6,000.

11. A composition according to claim 1, comprising a polymer with a molecular weight of at least 4,000.

12. A composition according to claim 11, comprising a polymer with a molecular weight of at least 6,000.

13. A composition according to claim 1, wherein the polymer is selected from the group consisting of polyethylene glycols with an average molecular weight of 1,000–6,000.

14. A composition according to claim 13, wherein the polymer is polyethylene glycol with an average molecular weight of 6,000.

15. A composition according to claim 1, wherein the polymer is dextran with a molecular weight of 10,000.

16. A composition according to claim 1, wherein the polymer is a polyethylene imine with a molecular weight of 450–750.

17. A composition according to claim 1, comprising from 30–70% by weight of the aqueous medium.

18. A composition according to claim 17, comprising 40–70% by weight of the aqueous medium.

19. A composition according to claim 1, further comprising non-cationic fabric-softening agents.

20. A composition according to claim 19, wherein the noncationic fabric-softening agent is sorbitan tristearate, or glycerol monostearate.

21. A composition according to claim 1, further comprising up to 20% by weight of a solvent.

22. A process for the preparation of a composition according to claim 1, wherein the cationic fabric-softening agent is melted first, after which the other ingredients are added to the melt.

* * * * *